(No Model.)
J. P. DUVAL.
CAR FENDER.
No. 592,516. Patented Oct. 26, 1897.
Fig. 1.
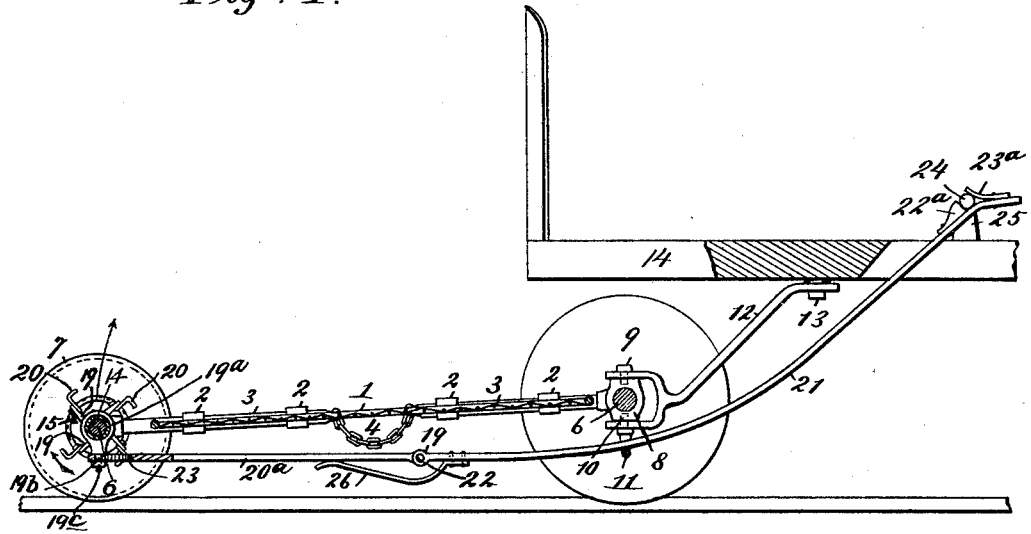
Fig. 2.
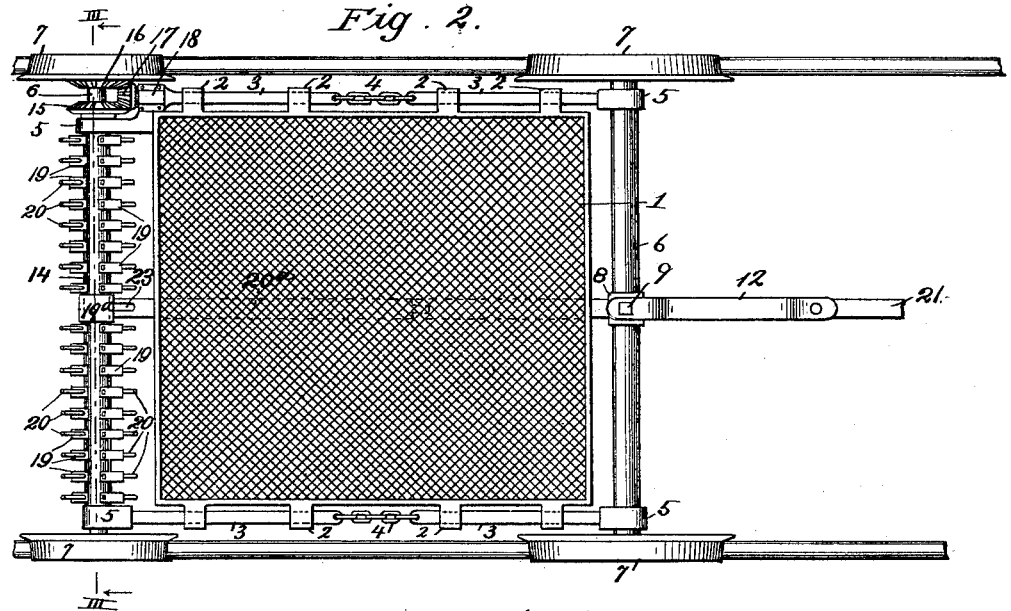
Fig. 3.
Witnesses
F. G. Fischer
Inventor
J. P. Duval
By Higdon & Higdon
Attys.

UNITED STATES PATENT OFFICE.

JENNIE P. DUVAL, OF KANSAS CITY, MISSOURI.

CAR-FENDER.

SPECIFICATION forming part of Letters Patent No. 592,516, dated October 26, 1897.

Application filed May 28, 1897. Serial No. 638,662. (No model.)

*To all whom it may concern:*

Be it known that I, JENNIE P. DUVAL, of Kansas City, Jackson county, Missouri, have invented certain new and useful Improvements in Car-Fenders, of which the following is a full, clear, and exact description, reference being had to the accompanying drawings, forming a part thereof.

My invention relates to street-car fenders; and its object is to produce a device of this character which will positively and reliably pick up any object or obstruction from the trackway, such as a child, an adult, or any other object upon which the rotary lifter can obtain a firm grasp.

A further object is to produce a fender of this character which, under the impact of a large object, such as another car or a vehicle, will yield and fold up out of the way, so as to reduce the chances of breakage or destruction of the fender to the minimum.

Other objects of the invention will hereinafter appear, and be pointed out in appended claims.

In order that the invention may be fully understood, I will proceed to describe it with reference to the accompanying drawings, in which—

Figure 1 represents a vertical longitudinal section of my improved car-fender. Fig. 2 represents a top plan view of the same. Fig. 3 represents a cross-section taken on the line III III of Fig. 2.

In the said drawings, 1 designates a fender composed of wire-gauze or equivalent material, in order that it may fold transversely under the impact resulting from a collision with a heavy object, as hereinbefore suggested, and as will be more fully referred to hereinafter. This flexible fender is provided with a series of alined guide-loops 2 at its opposite sides, and fitting therein are stiffening-rods 3, connected by short chains 4, so as not to interfere with the folding or bending operation of the fender. The rear ends of the rearmost rods and the front ends of the foremost rods 3 terminate in collars 5, and journaled therein are shafts 6, provided with wheels 7, which run upon the track-rails, the front wheels, by preference, being of much smaller diameter than ordinary car-wheels. The size of the rear wheels 7 is not so important.

The rear axle, in order that the device may adjust itself freely in turning curves, has a swivel connection with the car, such connections comprising a collar 8, mounted upon the middle of the axle, bolts 9 and 10, mounted thereon, the bolt 10 being provided with an eye or loop 11 and a bifurcated bracket 12, which is pivotally mounted at its lower end upon the bolts 9 and 10, and is bolted securely to the bottom of the car at its upper end, as shown at 13.

The front or collar end of one of the rods 3 is bent out of its direct course, and extending therethrough is a sleeve 14, which is journaled upon the front shaft 6. It carries the bevel gear-wheel 15 at one end, which is driven by the gear-wheel 16, cast upon the adjacent track-wheel 7, through the medium of the pinion 17, provided with a short stem which finds a journal in the bearing-box 18, secured to the rod 3, which is bent out of its course. By this arrangement it is obvious that the rotation of the track-wheels, due to friction, causes the rotation of the front shaft 6 forwardly and the sleeve 14 rearwardly, for a purpose which will presently be explained. Said sleeve is provided with a series of radiating arms 19, armed with the loosely-mounted angle-hooks 20, which are adapted to positively and reliably grasp an object as they rotate in the direction indicated by the arrow, Fig. 1, convey it upwardly and to the rear and deposit it upon the fender 1. By reason of being loosely mounted in said arms 19 they release the object, in case of a slight penetration, for instance, of the apparel of the person, without material, if any, injury.

19$^a$ designates a collar which is mounted loosely upon the middle of the sleeve 14, and depending from the same is a threaded extension 19$^b$, engaged by a nut 19$^c$.

A break-joint rod comprises the members 20$^a$ and 21, hinged or pivoted together as at 22. The front end of said rod is provided with a slot 23, through which the threaded extension 19$^b$ of the collar 19$^a$ extends. The rear end of the member 21 is provided with a catch comprising a block 22$^a$ and a spring 23$^a$, and this catch is adapted to engage the arm 24, projecting from a bracket 25, secured to the floor of the car adjacent to the position of the gripman, motorman, or driver, a slot being made for the passage of said rod. Said rod is also prevented from sagging by its passage through the eye or guide-loop of the pivot-rod 10.

When the catch is engaged by the arm 24 of the bracket 25, the break-joint rod is extended and its pivot is rearward of the hinge-point of the fender, as shown clearly in Fig. 1, so that as long as they are maintained in such positions, their pivotal points overlapping, it will practically be impossible, by the front end of the fender striking an obstruction, to collapse or fold upwardly. When the person in charge of the car, however, by pressing upon the end of the member 21 disengages said bar from the bracket 25, the pressure of the operator's foot, assisted by the weight of the bar itself, causes it to slide forwardly upon the extension $19^b$ until its pivotal point coincides approximately in position with the hinge-point of the fender, so that if an obstruction is met with the fender and rod will bend at their hinge-points and the device be folded upwardly in the direction indicated by the arrow, Fig. 1, toward the dashboard. In order to assist this operation, I by preference employ a spring 26, which is secured to one member and presses upwardly against the other member of said break-joint rod, as shown in Fig. 1. By this arrangement it is obvious that the car-controller, in the face of an impending collision, may disengage the break-joint bar and the bracket, in order that the impact, instead of crushing the fender, may simply cause it to bend upwardly at its middle in the manner referred to.

After the danger is passed or the collision has occurred the fender is again caused to assume its original and normal position and the rod is expanded and reëngaged with the bracket 25.

From the above description it will be apparent that I have produced a safety-fender for cars which embodies the advantages enumerated in the statement of invention and which is comparatively simple and inexpensive of manufacture.

It is to be understood, of course, that various changes may be made without departing from the spirit and scope of my invention or sacrificing any of its advantages.

Having thus described the invention, what I claim as new, and desire to secure by Letters Patent, is—

1. A car-fender, comprising a wheeled frame, a flexible fender or apron provided with guide-loops, bars mounted in said guide-loops and linked together at their opposing ends, and mounted upon the axles of the frame, a break-joint bar secured to a car and engaged with the rear end of said bar, substantially as and for the purpose set forth.

2. A car-fender, comprising a flexible fender or apron, provided with guide-loops at its side, bars engaging said guide-loops, chains connecting the opposing ends of said bars, shafts journaled in said bars at opposite ends of said fender or apron, wheels mounted upon said shafts and running upon the track-rails, a collar secured to the front shaft at its middle, a break-joint bar comprising two sections hinged together rearward of said chains, and one of them provided with a slot which engages the collar upon the front shaft, a guide-loop for the rear member, a spring secured to the rear member, and pressing upwardly against the front member, a bracket upon the car, and a spring-catch upon the rear member of the rod detachably engaging said bracket, substantially as described.

3. A car-fender, comprising a wheeled frame, a flexible fender or apron provided with guide-loops, bars mounted in said guide-loops and linked together at their opposing ends, and mounted upon the axles of the frame, a break-joint bar secured to a car and engaged with the rear end of said bar, a spring-catch secured to the rear end of the break-joint bar, and a bracket upon the car engaged by said catch, substantially as described.

4. A car-fender, comprising a wheeled frame, a flexible fender or apron provided with guide-loops, bars mounted in said guide-loops and linked together at their opposing ends, and supported by the wheeled frame, a rotating sleeve mounted upon the front axle of said frame and provided with arms having hooks so as to constitute a carrier, means to rotate the same, and a break-joint bar connecting the front end of said frame with the car, substantially as and for the purpose set forth.

In testimony whereof I affix my signature in the presence of two witnesses.

JENNIE P. DUVAL.

Witnesses:
M. R. REMLEY,
G. Y. THORPE.